(12) United States Patent
Kadowaki

(10) Patent No.: US 9,917,501 B2
(45) Date of Patent: Mar. 13, 2018

(54) SEMICONDUCTOR DEVICE

(71) Applicant: Rohm Co., Ltd., Kyoto (JP)

(72) Inventor: Keisuke Kadowaki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 53 days.

(21) Appl. No.: 15/045,515

(22) Filed: Feb. 17, 2016

(65) Prior Publication Data

US 2016/0248326 A1 Aug. 25, 2016

(30) Foreign Application Priority Data

Feb. 20, 2015 (JP) .................................. 2015-031796

(51) Int. Cl.
*H02M 3/158* (2006.01)
*H02M 1/088* (2006.01)
*H02M 7/5387* (2007.01)

(52) U.S. Cl.
CPC .......... *H02M 1/088* (2013.01); *H02M 3/1588* (2013.01); *H02M 7/5387* (2013.01); *Y02B 70/1466* (2013.01)

(58) Field of Classification Search
CPC ...... H02M 1/088; H02M 1/096; H02M 3/155; H02M 3/158; H02M 3/1588; H02M 2003/155; H02M 2003/158; Y02B 70/1458; Y02B 70/1466
See application file for complete search history.

(56) References Cited

U.S. PATENT DOCUMENTS

| | | | |
|---|---|---|---|
| 9,007,793 B2* | 4/2015 | Zhao | H02M 3/33592 363/126 |
| 2014/0077778 A1* | 3/2014 | Sato | H01L 29/407 323/282 |
| 2015/0130429 A1* | 5/2015 | Horie | H02M 1/08 323/271 |

FOREIGN PATENT DOCUMENTS

JP 2005-123486 5/2005

* cited by examiner

*Primary Examiner* — Matthew Nguyen
(74) *Attorney, Agent, or Firm* — Fish & Richardson P.C.

(57) ABSTRACT

A semiconductor device includes a plurality of transistors, each having a gate electrode including extending portions having a length obtained by dividing the gate electrode causing interruption to switching at a desired frequency, wherein current inflow terminals of the plurality of transistors are connected to each other and current outflow terminals of the plurality of transistors are connected to each other.

8 Claims, 11 Drawing Sheets

US 9,917,501 B2

SEMICONDUCTOR DEVICE

CROSS-REFERENCE TO RELATED APPLICATION

This application is based upon and claims the benefit of priority from Japanese Patent Application No. 2015-031796, filed on Feb. 20, 2015, the entire contents of which are incorporated herein by reference.

TECHNICAL FIELD

The present disclosure relates to a semiconductor device.

BACKGROUND

Conventionally, a power transistor such as a metal-oxide semiconductor field effect transistor (MOSFET) is used in a DC/DC converter or the like.

FIG. 9 illustrates a configuration example of an existing DC/DC converter using a power transistor. A DC/DC converter 10 illustrated in FIG. 9 is a step-down type switching power circuit (synchronous regulator) that generates an output voltage Vout from an input voltage Vin and outputs the output voltage Vout.

The DC/DC converter 10 includes a transistor Q1 as a p-channel MOSFET power transistor, a transistor Q2 as an n-channel MOSFET power transistor, an inductor L1, a condenser C1, pre-drivers PD1 and PD2, and control logic units CL1 and CL2. These components constituting the DC/DC converter 10 are integrated in a single IC chip (power supply chip) to form a semiconductor device.

An upper transistor Q1 and a lower transistor Q2 are connected in series between an application terminal of an input voltage Vin and a ground terminal to from a bridge (switch output terminal). Specifically, a source of the transistor Q1 is connected to the application terminal of the input voltage Vin, a drain of the transistor Q1 is connected to a drain of the transistor Q2, and a source of the transistor Q2 is connected to a ground terminal.

A connection point between the drains of the transistors Q1 and Q2 is connected to one end of the inductor L1. The other end of the inductor L1 is connected to one end of the condenser C1 together with an output terminal of the output voltage Vout. The other end of the condenser C1 is connected to the ground terminal.

The pre-driver PD1 for outputting a driving signal to a gate of the transistor Q1 includes a transistor M11 as a p-channel MOSFET and a transistor M12 as an n-channel MOSFET. The upper transistor M11 and the lower transistor M12 are connected in series between an application terminal of a source voltage Vdd and the ground terminal to form a bridge.

The pre-driver PD2 for outputting a driving signal to a gate of the transistor Q2 includes a transistor M21 as a p-channel MOSFET and a transistor M22 as an n-channel MOSFET. The upper transistor M21 and the lower transistor M22 are connected in series between the application terminal of the source voltage Vdd and the ground terminal to form a bridge.

As the transistors M11 and M12 are complementarily (exclusively) turned on and off by the control logic unit CL1, the driving signal is generated by the pre-driver PD1 and output to the gate of the transistor Q1. Further, as the transistors M21 and M22 are complementarily (exclusively) turned on and off by the control logic unit CL2, the driving signal is generated by the pre-driver PD2 and output to the gate of the transistor Q2. The transistors Q1 and Q2 are complementarily (exclusively) turned on and off by the respective driving signals from the pre-drivers PD1 and PD2. Accordingly, a pulse-shaped switch voltage Vsw is generated from the input voltage Vin.

The term "complementarily (exclusively)" used herein includes a case in which a simultaneous OFF period of two transistors is set in terms of prevention of a through current, as well as a case in which ON/OFF of two transistors are completely reversed.

Further, the inductor L1 and the condenser C1 serves as a rectifying/smoothing circuit for rectifying/smoothing the switch voltage Vsw to generate a desired output voltage Vout.

Here, a schematic top view of a related-art transistor Q1 is illustrated in FIG. 10. Further, FIG. 10 illustrates a connection relationship of the transistor Q1 with the pre-driver PD1. As illustrated in FIG. 10, the transistor Q1 includes a comb-shaped gate electrode 11 including a plurality of extending portions 11A extending in an X direction and arranged in a Y direction substantially perpendicular to the X direction. Although not shown in FIG. 10, drain regions and source regions are alternately disposed in the Y direction between adjacent extending portions 11A. Further, the number of the extending portions 11A illustrated in FIG. 10 is set to 10 for the convenience of illustration, but actually it may be, for example, about 100.

Also, as illustrated in FIG. 10, a drain of the upper transistor M11 and a drain of the lower transistor M12, which constitute the pre-driver PD1, are connected to the gate electrode 11 by a wiring 21 formed of a metal. The driving signal is transmitted to the gate electrode 11 through the wiring 21.

Further, examples of the power transistor are disclosed in the related art.

As illustrated in FIG. 10, in order to secure a large amount of current in the transistor Q1 as the power transistor (i.e., in order to reduce ON resistance), the extending portions 11A of the gate electrode 11 extends in the extending direction (X direction) in the structure of the transistor Q1. Further, when the gate electrode 11 is formed of a material (polysilicon or the like) other than a metal, a circuit diagram of the transistor Q1 may be shown as illustrated in FIG. 11.

The transistor Q1 illustrated in FIG. 11 has a configuration in which transistors Q1-1 to Q1-10 corresponding to regions divided in the X direction of FIG. 10 are connected in parallel. Resistors R1 to R10 are connected in series in a line connected to the gates of the transistors Q1-1 to Q1-10.

According to this configuration, a charge amount of the driving signal per unit time is reduced in a direction from the resistor R1 to the resistor R10. Thus, for example, as illustrated in FIG. 12, a rise delay of a gate voltage is increased in a direction from the transistor Q1-1 to the transistor Q1-10 according to a gate capacitance of each transistor (in FIG. 12, only Q1-5 is illustrated as transistors between the transistors Q1-1 to Q1-10 for convenience). In other words, the response delay of the gate voltage is most significantly generated at the right end of the transistor Q1 of FIG. 10.

Thus, in a case in which the extending portions of the gate electrode formed of a material other than a metal are elongated, it is difficult to switch the transistor quickly. This is the same for the transistor Q2 as an n-channel MOSFET, as well as for the transistor Q1 as a p-channel MOSFET.

SUMMARY

The present disclosure provides some embodiments of a semiconductor device enabling fast switching, while securing a large amount of current.

According to one embodiment of the present disclosure, there is provided a semiconductor device: including a plurality of transistors, each having a gate electrode including extending portions having a length obtained by dividing the gate electrode causing interruption to switching at a desired frequency, wherein current inflow terminals of the plurality of transistors are connected to each other and current outflow terminals of the plurality of transistors are connected to each other (first configuration).

Further, the device having the first configuration may further include: a plurality of drivers installed in the plurality of transistors and connected to the gate electrodes of the transistors by wirings (second configuration).

Also, in the second configuration, each of the plurality of drivers may include an upper transistor and a lower transistor (third configuration).

In addition, in one of the first to third configurations, the extending portions of each of the plurality of transistors may have the same length in the extending direction and the same number of arrangements, the number of arrangements being more than one (fourth configuration).

Also, in one of the first to fourth configurations, the gate electrode included in each of the plurality of transistors may be formed in a comb-like shape including a portion for connecting a plurality of the extending portions (fifth configuration).

Further, in one of the first to fifth configurations, the device may further include: a plurality of first drivers installed in each of the plurality of transistors and connected to the gate electrodes of the transistors by wirings; a plurality of second drivers installed in each of the upper transistors included in the first drivers; and a plurality of third drivers installed in each of the lower transistors included in the first drivers (sixth configuration).

Also, in one of the first to sixth configurations, the gate electrode included in each of the plurality of transistors may be formed of a material other than a metal (seventh configuration).

Also, in one of the first to sixth configurations, the device may include a switching power circuit having a switching element including the plurality of transistors (eighth configuration).

Also, in the eighth configuration, the switching power circuit may be a synchronous rectifying type power circuit including an inductor and a capacitor connected to the switching element installed at a switch output terminal (ninth configuration).

Further, according to another embodiment of the present disclosure, there is provided an electronic device including the semiconductor device having any one of the foregoing configurations.

DETAILED DESCRIPTION

First Embodiment

Figure 1:
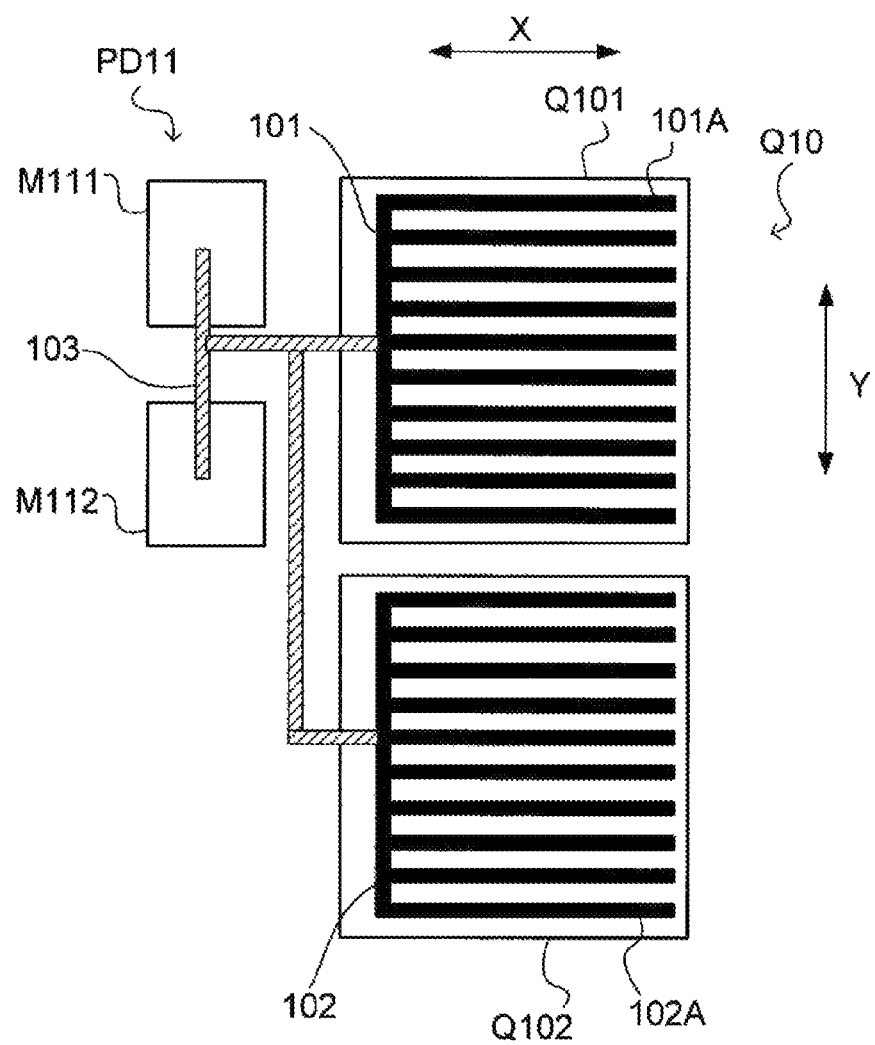
FIG. 1 is a view illustrating a configuration of a power transistor and a pre-driver for driving the power transistor according to a first embodiment of the present disclosure.

Hereinafter, an embodiment of the present disclosure will be described with reference to the drawings. A schematic top view of a power transistor according to a first embodiment of the present disclosure is illustrated in FIG. 1. FIG. 1 also illustrates a pre-driver for driving the corresponding power transistor.

A power transistor Q10 illustrated in FIG. 1 includes a transistor Q101 and a transistor Q102 as separate transistors, and corresponds to the upper transistor Q1 of the related art DC/DC converter 10 (FIG. 9) described above.

Figure 10:
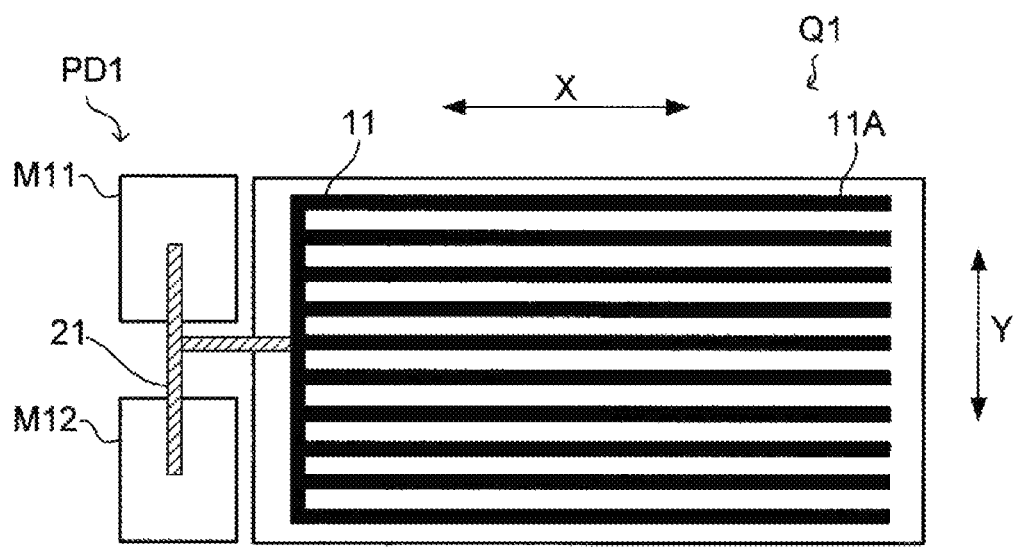
FIG. 10 is a view illustrating a configuration of a power transistor and a pre-driver for driving the power transistor according to the related art.
Figure 11:
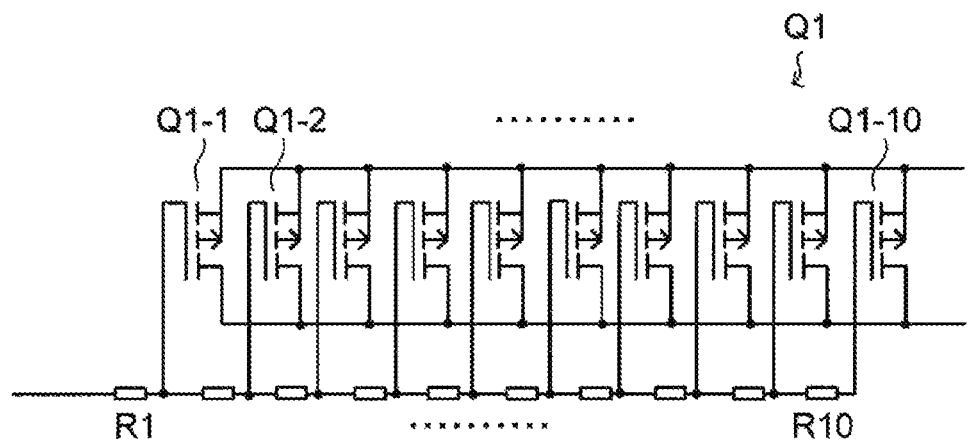
FIG. 11 is a circuit diagram of the power transistor according to the related art.
Figure 12:
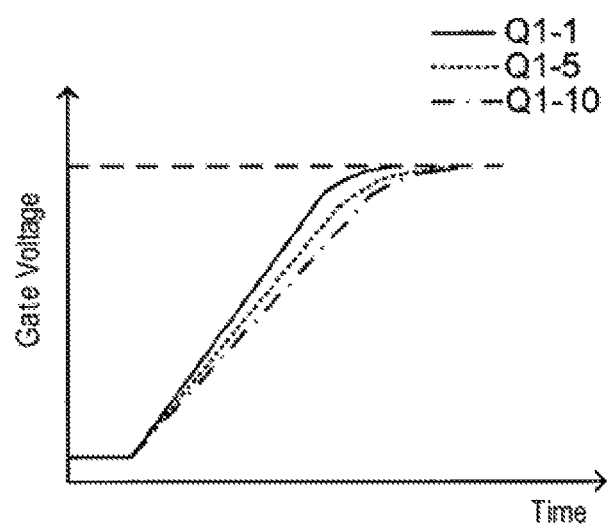
FIG. 12 is a view illustrating a response example of a gate voltage of the power transistor according to the related art.

The extending portions 11A of the gate electrode 11 of the transistor Q1 illustrated in FIG. 10 are bisected in the X direction (extending direction) to form extending portions 101A and extending portions 102A, and a transistor Q101 includes a comb-shaped gate electrode 101 including the extending portions 101A, and a transistor Q102 includes a comb-shaped gate electrode 102 including the extending portions 102A. The gate electrodes 101 and 102 are formed of a material (polysilicon or the like) other than a metal.

Further, although not shown in FIG. 1, a source region and a drain region are alternately disposed between adjacent extending portions 101A and 102A in an arrangement direction (Y direction) of the extending portions, and source regions (current inflow terminals) of the transistors Q101 and Q102 are connected, and drain regions (current outflow terminals) of the transistors Q101 and Q102 are connected.

Further, in FIG. 1, drains of an upper transistor M111 (p-channel MOSFET) and a lower transistor M112 (n-channel MOSFET) constituting a pre-driver PD11 are connected to the gate electrodes 101 and 102 by a wiring 103 formed of a metal.

Figure 2:
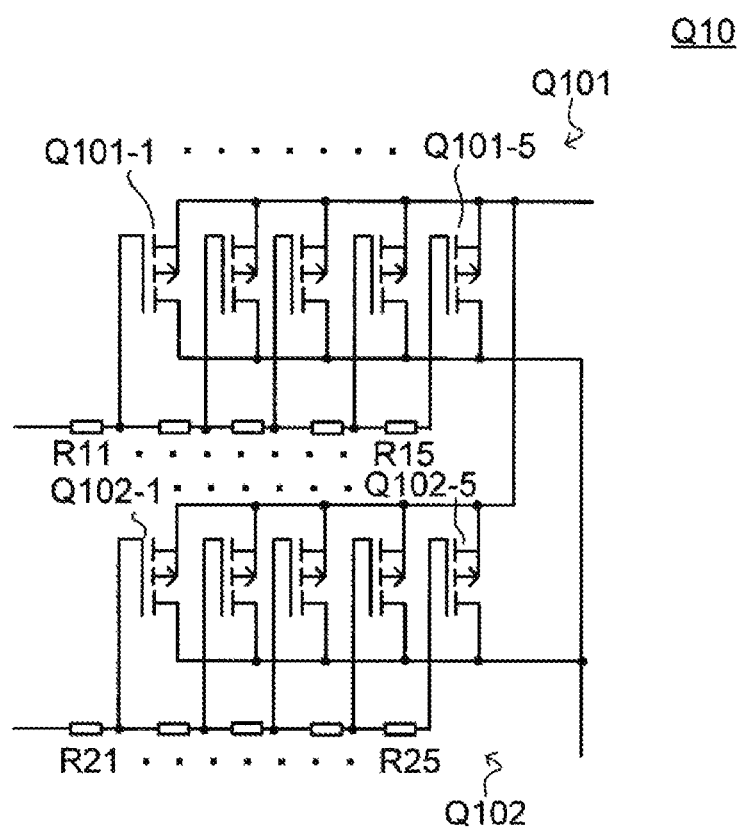
FIG. 2 is a circuit diagram of the power transistor according to the first embodiment of the present disclosure.

FIG. 2 is a circuit diagram of the power transistor Q10 of FIG. 1. As illustrated in FIG. 2, in the transistor Q101, transistors (p-channel MOSFETs) Q101-1 to Q101-5 respectively corresponding to regions when the extending portions 101A are divided in the extending direction (X direction) are connected in parallel. Further, resistors R11 to R15 are connected in series in a line connected to gates of the transistors Q101-1 to Q101-5.

Similarly, in the transistor Q102, transistors (p-channel MOSFETs) Q102-1 to Q102-5 respectively corresponding to regions when the extending portions 102A are divided in the extending direction (X direction) are connected in parallel. Further, resistors R21 to R25 are connected in series in a line connected to gates of the transistors Q102-1 to Q102-5.

Further, in the transistors Q101-1 to Q101-5 and the transistors Q102-1 to Q102-5, sources thereof are connected to each other and drains thereof are also connected to each other.

As illustrated in FIG. 10 described above, when the extending portions 11A of the gate electrode 11 are elongated in the extending direction, a response delay of a gate voltage is increased and fast switching at a desired frequency is problematic. Compared with the case of FIG. 10, in case of the transistors Q101 and Q102 illustrated in FIG. 1, the lengths of the extending portions 101A and 102A in the extending direction are formed by dividing the length of the extending portions 11A, so that a response delay of a gate voltage due to resistors R11 to R15 and R21 to R25 in the transistors Q101 and Q102 can be reduced, and fast switching is possible at the desired frequency. Since the sources of the transistors Q101 and Q102 are connected to each other and the drains of the transistors Q101 and Q102 are connected to each other, a current amount can be secured. Thus, fast switching is possible, while securing a large amount of current (i.e., low ON resistance) with the power transistor Q10.

Further, the number of divided extending portions of the gate electrode in the extending direction is not limited to 2 and may be greater. In other words, the power transistor may be configured with a number of transistors corresponding to a division number. This is also the same in the following embodiments.

Second Embodiment

Next, a second embodiment of the present disclosure will be described. In the first embodiment, as illustrated in FIG. 1, since the common pre-driver PD11 is prepared for the transistors Q101 and Q102, a portion with an extended length is present in a layout of the wiring 103, and thus, the wiring 103 needs to be increased.

Figure 3:
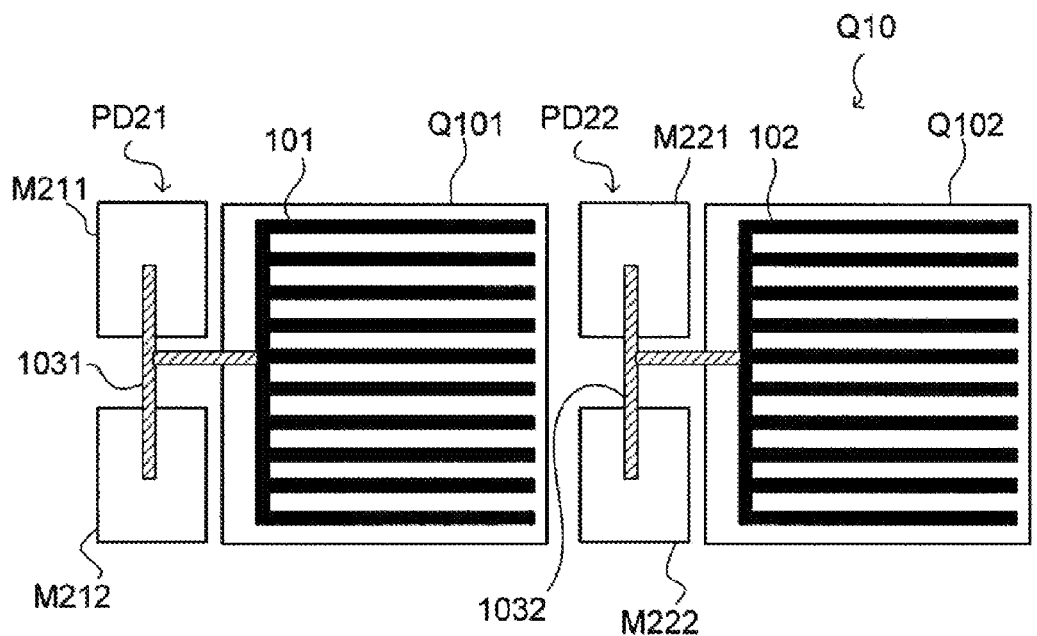
FIG. 3 is a view illustrating a configuration of a power transistor and a pre-driver for driving the power transistor according to a second embodiment of the present disclosure.

Thus, in this embodiment, as illustrated in FIG. 3, a pre-driver PD21 is prepared for the transistor Q101, and a pre-driver PD22 is prepared for the transistor Q102. The pre-driver P21 includes an upper transistor M211 and a lower transistor M212 and is connected to the transistor Q101 by a wiring 1031 formed of a metal. Similarly, the pre-driver P22 includes an upper transistor M221 and a lower transistor M222 and is connected to the transistor Q102 by a wiring 1032 formed of a metal. Configurations of the transistors Q101 and Q102 are the same as those of the first embodiment.

According to this embodiment, since the pre-driver PD21 and the pre-driver PD22 are prepared near the transistor Q101 and the transistor Q102, respectively, the wirings 1031 and 1032 can be shortened and can be good in spite of being thin.

Third Embodiment

Figure 4:
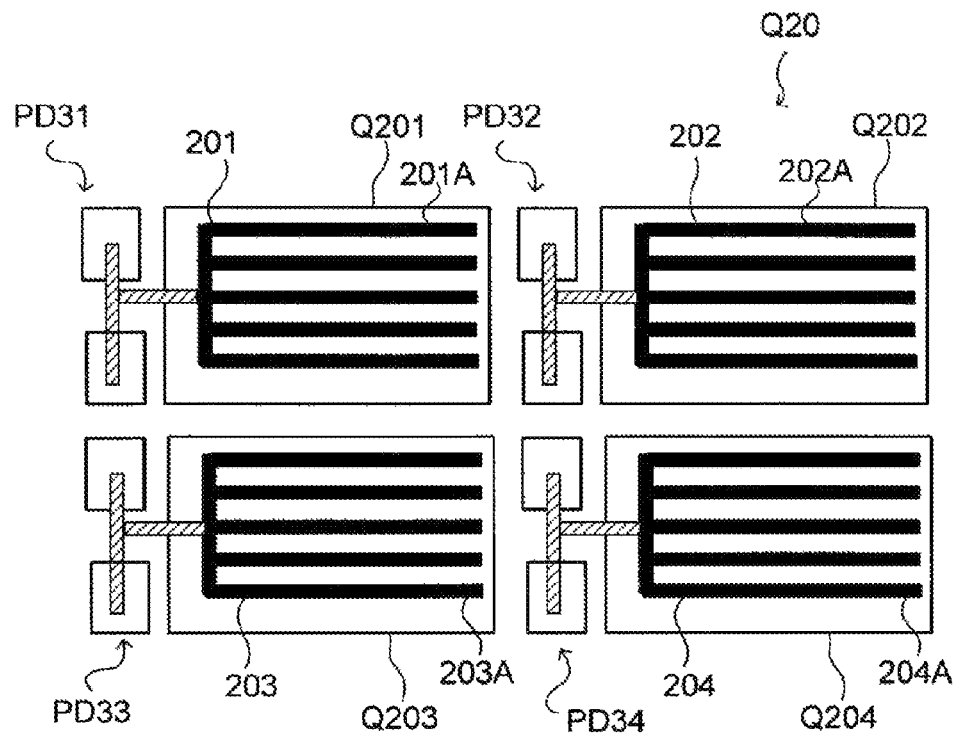
FIG. 4 is a view illustrating a configuration of a power transistor and a pre-driver for driving the power transistor according to a third embodiment of the present disclosure.

Next, a third embodiment of the present disclosure will be described. A schematic top view of a power transistor according to this embodiment is illustrated in FIG. 4. A power transistor Q20 illustrated in FIG. 4 includes separate transistors Q201, Q202, Q203, and Q204.

In this embodiment, extending portions 201A, 202A, 203A, and 204A are formed by bisecting the elongated extending portions 11A illustrated in FIG. 10 both in the extending direction (X direction) and the arrangement direction (Y direction), and transistors Q201 to Q204 have comb-shaped gate electrodes 201, 202, 203, and 204 including the extending portions 201A, 202A, 203A, and 204A, respectively. In the transistors Q201 to Q204, sources thereof are connected to each other and drains thereof are connected to each other.

Further, pre-drivers PD31 to PD34 are prepared for the transistors Q201 to Q204, respectively.

According to this embodiment, the same effects as those of the first and second embodiments can be obtained. Further, when the extending portions 201A to 204A have the same length in the extending direction and the same arrangement number, formation can be facilitated in forming the power transistor Q20 and manufacturing semiconductor equipment.

Further, since the number of arrangement of the extending portions 11A of FIG. 10 is set to 10 for the convenience of illustration, in FIG. 4, the number of arrangement of the extending portions of the respective transistors is bisected to five extending portions, respectively, but actually, for example, when 100 extending portions are arranged in the state of FIG. 10, in this embodiment, 100 extending portions may be quartered to be arranged by 25 in each section (in other words, when expressed as illustrated in FIG. 4, a power transistor is configured to include a total of 8 transistors (4 columns in a vertical direction×2 rows in a horizontal direction) is configured).

Fourth Embodiment

Next, a fourth embodiment of the present disclosure will be described. A power transistor and a configuration for driving the power transistor according to this embodiment are illustrated in FIG. 5.

Figure 5:
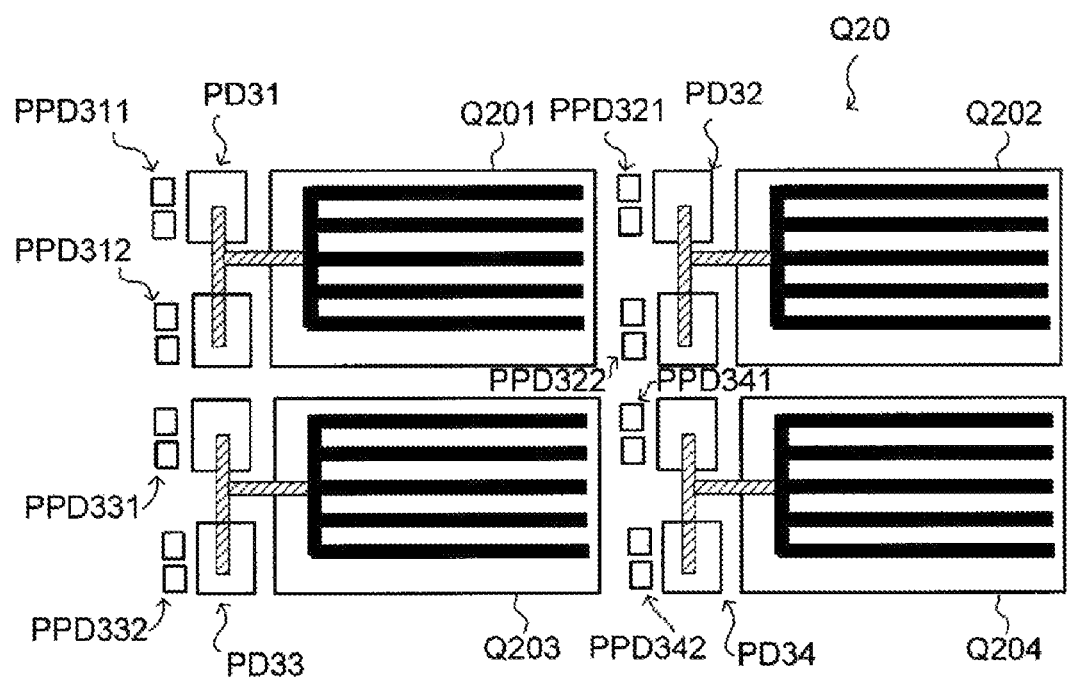
FIG. 5 is a view illustrating a configuration of a power transistor and a pre-driver for driving the power transistor according to a fourth embodiment of the present disclosure.

A configuration of a power transistor Q20 including transistors Q201 to Q204 illustrated in FIG. 5 and configurations of pre-drivers PD31 to PD34 corresponding to the respective transistors are the same as those of the third embodiment (FIG. 4).

In this embodiment, pre-drivers PPD311 and PPD312 are further provided for driving an upper transistor and a lower transistor constituting the pre-driver PD31, respectively. The pre-drivers PPD311 and PPD312 also include an upper transistor and a lower transistor, respectively. Similarly, pre-drivers PPD321 and PPD322 are further provided for the pre-driver PD32, pre-drivers PPD331 and PPD332 are further provided for the pre-driver PD33, and pre-drivers PPD341 and PPD342 are further provided for the pre-driver PD34.

According to this embodiment, the same effects as those of the third embodiment can be obtained, and even when driving is interrupted due to current capability of a control logic unit (see FIG. 9) for outputting a driving signal only with the pre-drivers PD31 to PD34, driving can be performed by providing the pre-driver PPD311 or the like at the former stage.

Figure 9:
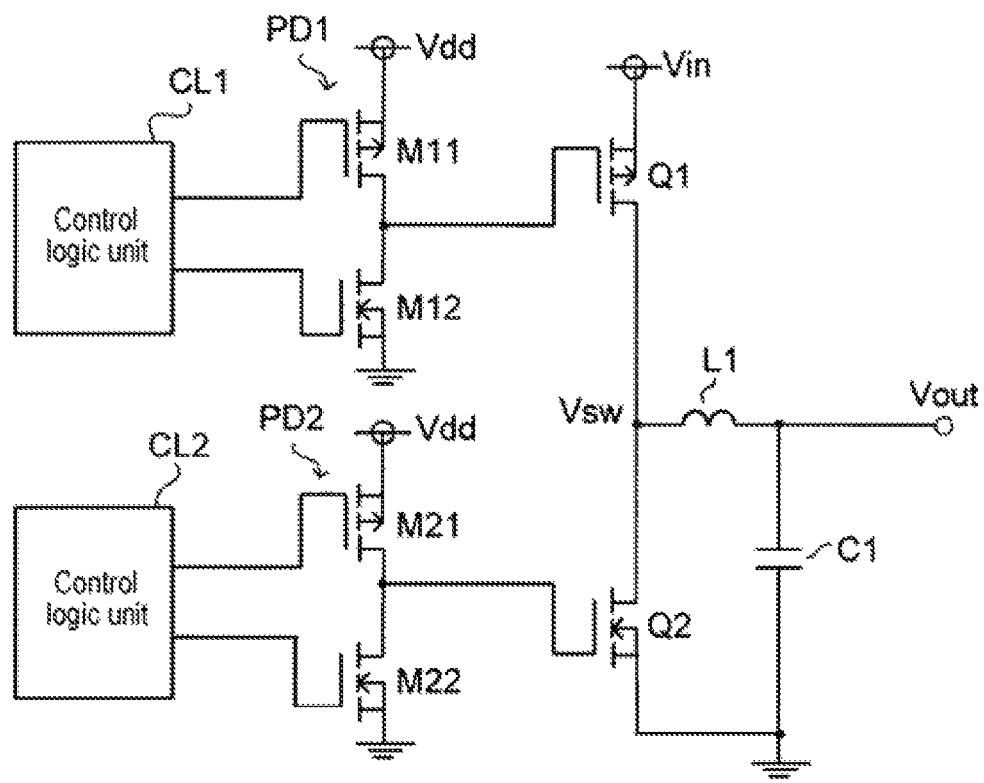
FIG. 9 is a view illustrating a configuration of a DC/DC converter according to the related art.

Further, although the power transistors according to the first to fourth embodiments described above are illustrated to correspond to the upper transistor Q1 (p-channel MOSFET) of the DC/DC converter 10 illustrated in FIG. 9, the power transistors may also correspond to the lower transistor Q2 (n-channel MOSFET). In this case, each of the transistors constituting the power transistors is configured as an n-channel MOSFET.

<Applications to Electronic Device>

Figure 6:
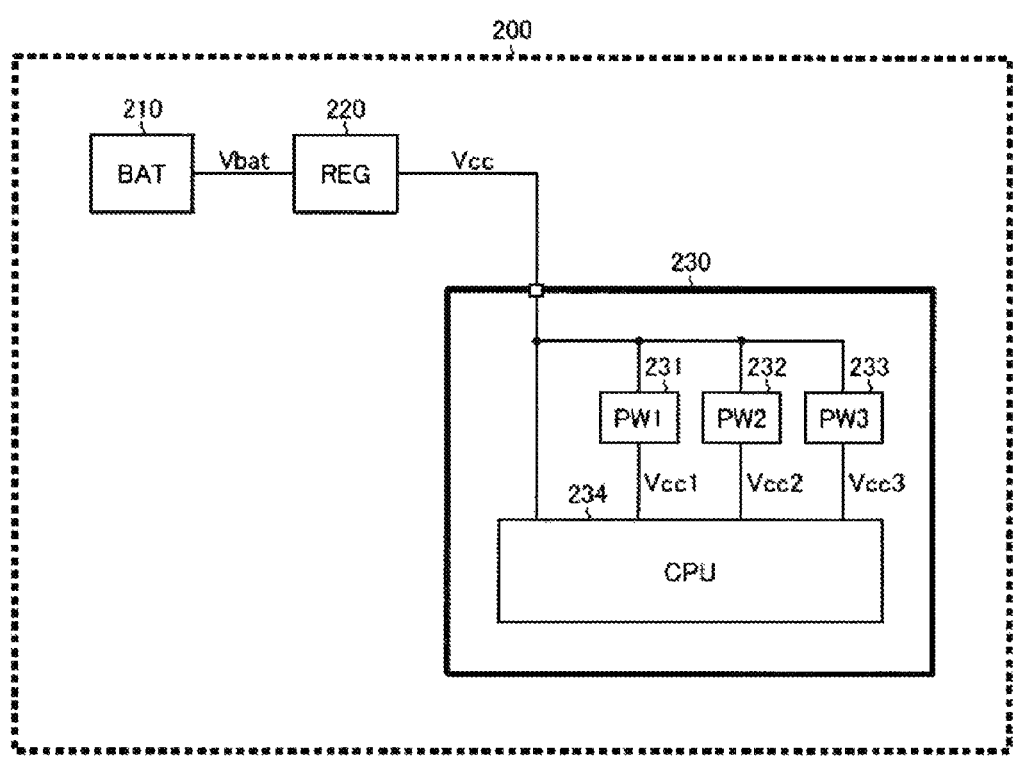
FIG. 6 is a block diagram of an electronic device according to an embodiment of the present disclosure.

FIG. 6 is a block diagram illustrating a configuration example of an electronic device 200. In this configuration example, the electronic device 200 includes a battery 210, a regulator 220, and a central processing unit (CPU) package 230.

The battery 210 is a power source of the electronic device 200, and for example, a lithium ion secondary battery or the like may be used as the battery 210.

The regulator 220 converts a battery voltage Vbat supplied from the battery 210 into an external power supply voltage Vcc (e.g., 3.3V) and supplies the converted voltage to the CPU package 230.

The CPU package 230 is a multi-chip type package including a plurality of (three in this drawing) power supply chips 231 to 233 and a CPU chip 234.

The power supply chips 231 to 233 generate internal source voltages Vcc1 to Vcc3 (e.g., 2.0V, 1.5V, and 1.2V) from the external power supply voltage Vcc and supply the generated internal source voltages Vcc1 to Vcc3 to each part of the CPU chip 234.

The CPU chip 234 operates by receiving the external power supply voltage Vcc and the internal source voltages Vcc1 to Vcc3, and generally controls an overall operation of the electronic device 200.

Here, the DC/DC converter including the power transistors, pre-drivers, and control circuits for driving the pre-drivers according to the above-described first to fourth embodiments is integrated into a single power supply chip (semiconductor device). Further, since the power transistors enable fast switching, the components such as the condenser and the inductor of the DC/DC converter can be reduced in size, and the power supply chip can be reduced in size. Therefore, when the power supply chip is incorporated as the power supply chips 231 to 233, the plurality of power supply chips 231 to 233 can be installed within the single CPU package 230, without unnecessarily increasing a package size.

In this manner, in the case of the CPU package 230 equipped with the plurality of power supply chips 231 to 233, the CPU package 230 is driven, without being supplied with power from a plurality of systems. Thus, since there is no need to prepare a plurality of regulators outside of the CPU package 230, the electronic device 200 can be reduced in size.

Further, although the power supply chips 231 to 233 and the CPU chip 234 are disposed as separate chips in this configuration example, it is possible to further shrink the CPU package 230 by integrating these chips into a single chip.

Figure 7:
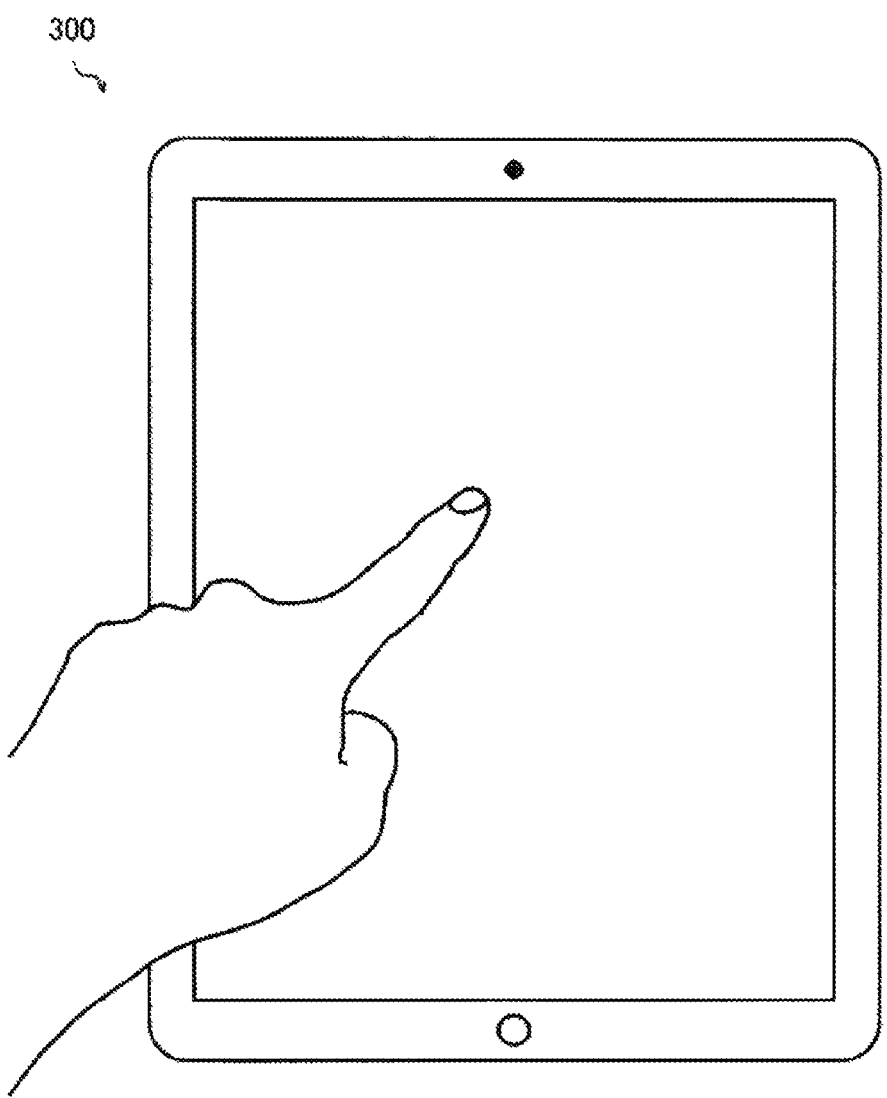
FIG. 7 is a view illustrating a tablet terminal according to an example of the electronic device of the present disclosure.

FIG. 7 is a view illustrating an external appearance of a tablet terminal 300. The tablet terminal 300 is a specific example of the electronic device 200 described above. The tablet terminal 300, which reduction in weight and thickness is strongly desired, is appropriate as a target in which the power supply chip according to this embodiment is to be installed.

Other Modifications

Figure 8A:
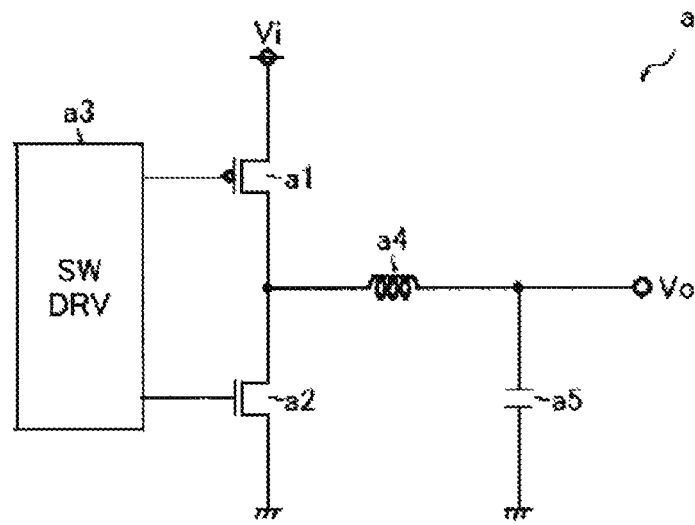
FIGS. 8A to 8C are views illustrating application examples of the present disclosure in the form of a table.
Figure 8B:
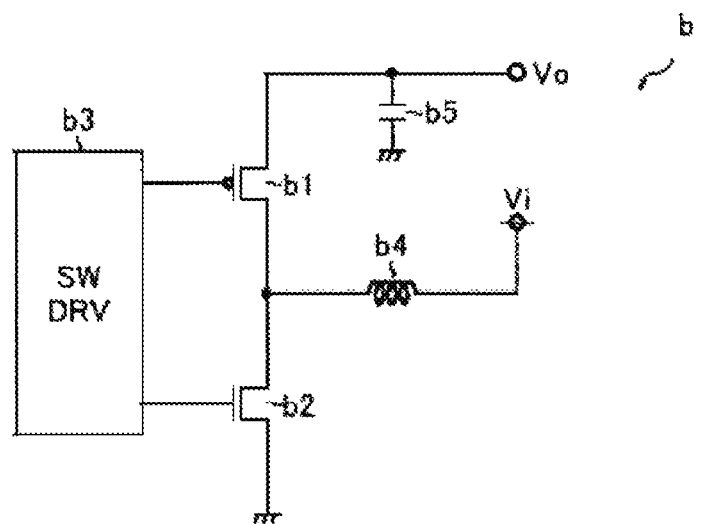
Figure 8C:
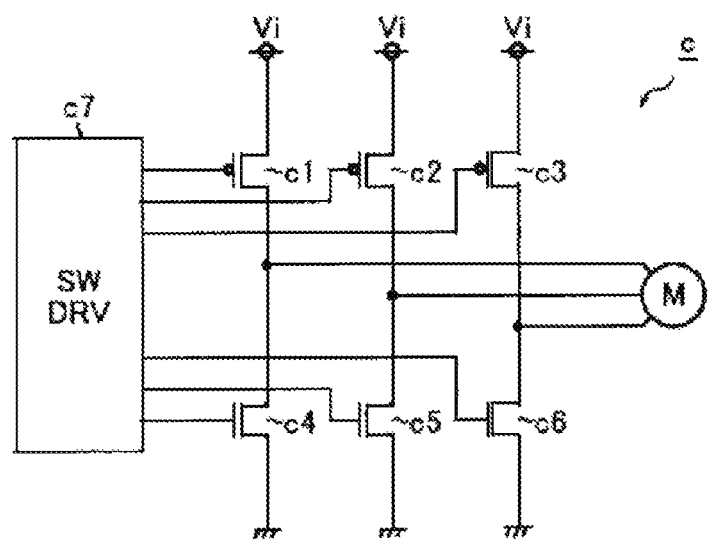

FIGS. 8A to 8C are views illustrating application examples of the present disclosure. As mentioned in the foregoing embodiments, the present disclosure may be applied to a step-down switching regulator a (see FIG. 8A) which steps down an input voltage by driving a switch output terminal to generate an output voltage.

However, the application target of the present disclosure is not limited thereto and may be generally applied to a synchronous rectifying type switching regulator (for example, a step-up switching regulator b (see FIG. 8B) which steps up an input voltage by driving a switch output terminal to generate an output voltage), and may also be applied to a motor driver c (see FIG. 8C) which drives a switch output terminal and supplies a driving current to a motor.

In addition, various electronic devices (a smartphone, a personal computer, etc.) other than the tablet terminal (FIG. 7) may also be applied to applications to which the present disclosure is applied.

Thus, various technical features disclosed herein may be modified in a variety of ways, in addition to the foregoing embodiments, without departing from the spirit of the present disclosure. For example, the present disclosure is not limited to the MOSFET and may also be applied to an insulated gate bipolar transistor (IGBT) and the like. In other words, it should be understood that the embodiments are merely illustrative and not intended to limit the scope of the present disclosure in all aspects. The technical scope of the present disclosure is presented by claims, rather than the description of the embodiments, and thus, is to be understood to encompass all changes that fall within the meaning and range equivalent to the scope of the claims.

According to the present disclosure in some embodiments, it is possible to provide a semiconductor device enabling fast switching, while securing a large amount of current.

The present disclosure can be widely used, for example, in a switching power circuit.

What is claimed is:

1. A semiconductor device, comprising:
a plurality of drivers, each of which includes a respective upper transistor and a respective lower transistor, wherein a respective gate of each of the upper transistors is configured to receive a same logic signal;
a plurality of additional transistors, each having a respective gate electrode including extending portions having a length obtained by dividing the gate electrode to switch at a particular frequency,
wherein current inflow terminals of the additional transistors are connected to each other and current outflow terminals of the additional transistors are connected to each other, and
wherein the drivers are installed, respectively, in the additional transistors and are connected to the gate electrodes of the additional transistors by respective wirings.

2. The device of claim 1, wherein the extending portions of each of the plurality of transistors have the same length in an extending direction and the same number of arrangements, the number of arrangements being more than one.

3. The device of claim 1, wherein the gate electrode included in each of the plurality of transistors is formed in a comb-like shape including a portion for connecting a plurality of the extending portions.

4. The device of claim 1, wherein the gate electrode included in each of the plurality of transistors is formed of a material other than a metal.

5. The device of claim 1, wherein the device comprises a switching power circuit having a switching element including the plurality of transistors.

6. The device of claim 5, wherein the switching power circuit is a synchronous rectifying type power circuit comprising an inductor and a capacitor connected to the switching element installed at a switch output terminal.

7. An electronic device comprising the semiconductor device of claim 1.

8. A semiconductor device, comprising:
a plurality of transistors, each having a gate electrode including extending portions having a length obtained by dividing the gate electrode causing interruption to switching at a desired frequency;
a plurality of first drivers installed in each of the plurality of transistors and connected to the gate electrodes of the transistors by wirings, each of the plurality of first drivers including an upper transistor and a lower transistor;
a plurality of second drivers installed in each of the upper transistors included in the first drivers; and
a plurality of third drivers installed in each of the lower transistors included in the first drivers,
wherein current inflow terminals of the plurality of transistors are connected to each other and current outflow terminals of the plurality of transistors are connected to each other.

\* \* \* \* \*